(12) United States Patent
Liu et al.

(10) Patent No.: US 11,625,737 B2
(45) Date of Patent: Apr. 11, 2023

(54) CONTEXTUAL MARKETING SYSTEM BASED ON PREDICTIVE MODELING OF USERS OF A SYSTEM AND/OR SERVICE

(71) Applicant: INTUIT INC., Mountain View, CA (US)

(72) Inventors: Juan Liu, Mountain View, CA (US); Ying Yang, Mountain View, CA (US); Amrita Damani, Mountain View, CA (US); David Joseph Antestenis, Mountain View, CA (US); Aaron Dibner-Dunlap, Mountain View, CA (US); Grace Wu, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 137 days.

(21) Appl. No.: 16/916,930

(22) Filed: Jun. 30, 2020

(65) Prior Publication Data

US 2021/0406931 A1    Dec. 30, 2021

(51) Int. Cl.
*G06Q 30/0202* (2023.01)
*G06Q 30/0201* (2023.01)
*G06N 20/00* (2019.01)
*H04L 51/04* (2022.01)
*G06N 3/02* (2006.01)

(52) U.S. Cl.
CPC ......... *G06Q 30/0202* (2013.01); *G06N 20/00* (2019.01); *G06Q 30/0201* (2013.01); *H04L 51/04* (2013.01); *G06N 3/02* (2013.01)

(58) Field of Classification Search
None
See application file for complete search history.

(56) References Cited

U.S. PATENT DOCUMENTS

| | | | |
|---|---|---|---|
| 2017/0006135 A1* | 1/2017 | Siebel | H04L 67/12 |
| 2019/0213511 A1* | 7/2019 | Higgins | G06Q 10/067 |
| 2020/0302506 A1* | 9/2020 | Parker | G06N 20/00 |
| 2021/0142384 A1* | 5/2021 | Nori | G06Q 30/0631 |
| 2021/0241320 A1* | 8/2021 | Chaudhari | G06Q 30/0204 |
| 2021/0406978 A1* | 12/2021 | Subramanian | G06N 3/044 |

OTHER PUBLICATIONS

Luciano et al., Increasing loyalty using predictive modeling in Business-to-Business Telecommunication, arXiv, Jun. 15, 2015 (Year: 2015).*

* cited by examiner

*Primary Examiner* — Chesiree A Walton
(74) *Attorney, Agent, or Firm* — DLA Piper LLP (US)

(57) ABSTRACT

Predictive modeling within a special purpose hardware platform to determine scenarios that are most likely to increase conversion potential for each trial user and retention potential for each active subscriber of a service, collectively referred to as a propensity score. The predictive models are integrated with a contextual marketing system that uses a loss risk assessment to learn user behavior and optimize content messaging designed to improve actual conversion or retention behavior for the user.

20 Claims, 7 Drawing Sheets

CONTEXTUAL MARKETING SYSTEM BASED ON PREDICTIVE MODELING OF USERS OF A SYSTEM AND/OR SERVICE

BACKGROUND

Delivery and licensing models such as Software as a Service (SaaS), Platform as a Service (PaaS), Infrastructures as a Service (IaaS), and other similar on-demand software such as subscription-based models, etc. have increasingly gained in popularity, especially in business software applications. With these models, users may access the provided services using a client via web browsers or mobile applications on mobile computing devices. Such models have been implemented under the end-to-end computer networking architecture where features or services reside in the end nodes of the computer network, while the users reside on the other end of the computer network.

An end-to-end computer networking architecture addresses the shortcomings of conventional software delivery and licensing models because the provided services and applications may need to be modified, and new features, applications, and or services may be added to the provided services. Each modification or addition of the provided services incurs costs. Yet users might have trouble discovering aspects of the provided services that will meet their needs without some assistance, especially if those features are located deep within the service providers' platform.

With high penetration rates and many services nearing commoditization, many service providers have recognized that it is more important than ever to find new ways to bring the full breadth and unique value of the provided services to their users. Providers typically use stock messages triggered by time or action in the product to highlight these provided services. Several messaging services offer time-based and event-based message handlers. It is possible to combine these along with the marketer's general intuition for how users might behave to create complex branching logic. However, these are ultimately inferior solutions because they are not able to determine the most viable pathway, since they rely on the user's own data without relation to the specific experience of others.

BRIEF DESCRIPTION OF THE DRAWINGS

In order to describe the manner in which the above-recited and other advantages and features of the disclosure can be obtained, a more particular description of the principles described above will be rendered by reference to specific examples illustrated in the appended drawings. These drawings depict only example aspects of the disclosure and are therefore not to be considered as limiting of its scope. The principles are described and explained with additional specificity and detail using the following drawings.

DETAILED DESCRIPTION

Figure 1:
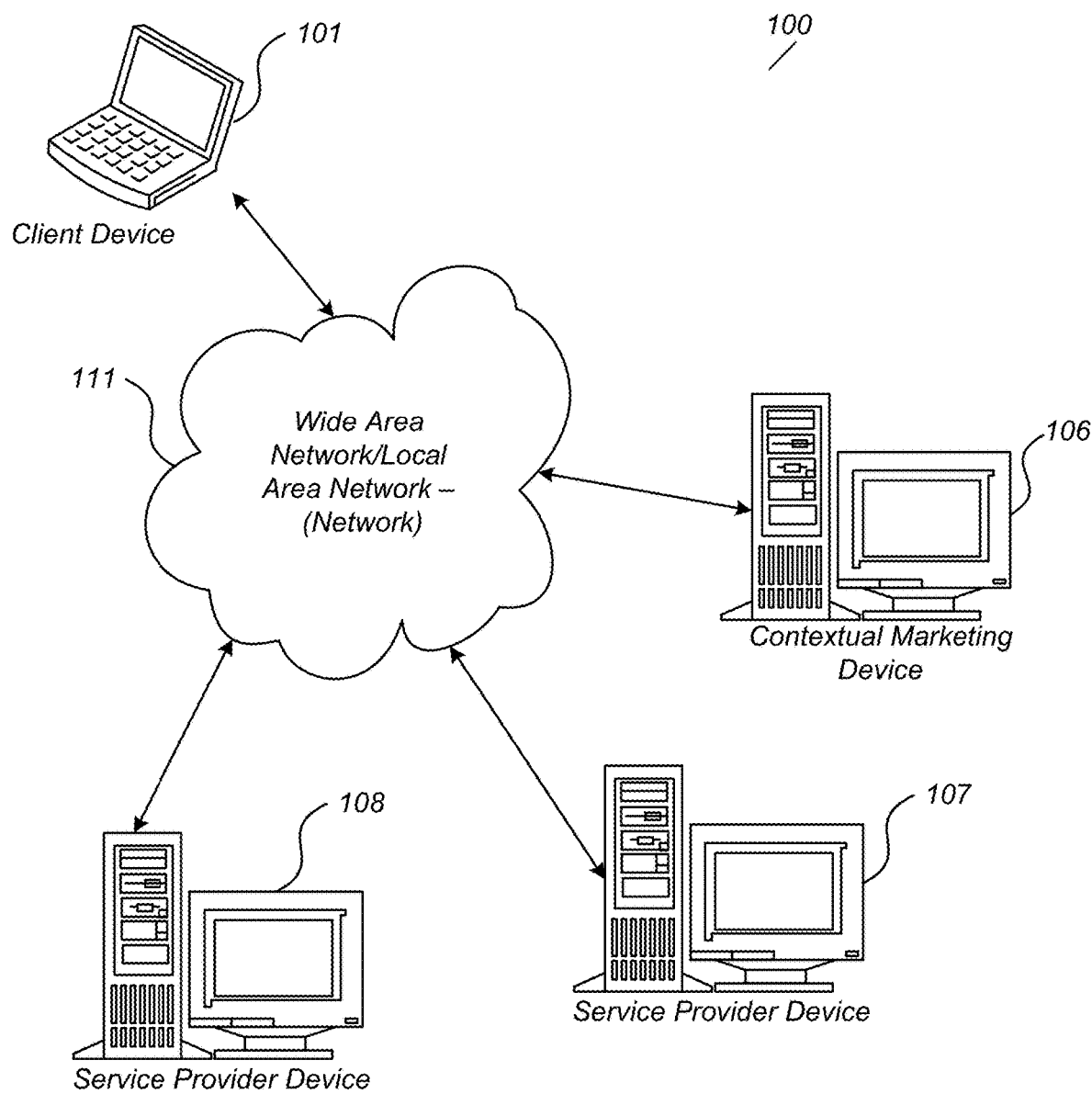
FIG. 1 illustrates an example server provider (SP) system in which certain examples of the disclosed principles may be implemented.

The following briefly describes the subject innovations in order to provide a basic understanding of some aspects of the techniques. This brief description is not intended as an extensive overview. It is not intended to identify key or critical elements, or to delineate or otherwise narrow the scope. Its purpose is merely to present some concepts in a simplified form as a prelude to the more detailed description that is presented later.

Embodiments described herein are configured to perform predictive modeling within a special purpose hardware platform to determine scenarios that are most likely to increase conversion potential for each trial user and retention potential for each active subscriber of a service, collectively referred to as a propensity score. As discussed further below, the predictive model may be a hypothetical situation or action that a provider's active trial user and/or subscriber (collectively referred to as "users") may take based on a current state of the user. A propensity score may be determined for each predictive model of a user. Loss risk is defined as non-conversion of a trial membership and/or churn of a subscription base membership. This is further defined below.

Furthermore, the predictive models are integrated with a contextual marketing system that uses a loss risk assessment to learn user behavior and optimize marketing campaigns designed to improve the propensity score for a user utilizing a service provider's platform. The disclosed examples address a computer-centric and Internet-centric problem related to a service provider system management to convert trial users and reduce churn of current subscribers, and further increase product engagement. The disclosed methods and system may be implemented as computer programs or application software on one or more computing devices that process user features collected by a data management system.

Users are not simply assigned to a large class and associated with a loss risk behavior of that class, rather, each user's individual context and behavior is assessed by the predictive model to determine a propensity score signaling the scenario that is most likely to reduce loss risk of the user. The predictive model predicts and identifies complex behavioral patterns that are consistent with subscribers who have churned and or trial users who have not converted within a defined past. The model may do so in a tailored way for distinct segments of an overall user base. The predictive model does not simply predict broad based behavioral trends; instead, the predictive model allows for a personalized hypothetical modeling of a current user.

In contrast to other approaches, which might make use of only static (or slowly changing) attributes of the user, the disclosed predictive model also makes use of dynamic features such as the sequence of daily activity. A propensity score, indicating a loss risk, is determined for each hypothetical scenario. A hypothetical scenario includes a possible action or engagement of the user with a service provider platform. The hypothetical scenario may be determined by processing data related to the user and analyzing the data related to the user, or similar users. Alternatively, the hypothetical scenario may be unrelated to the data related to the user and may be manually determined, or suggested on behalf of the service provider. As disclosed further below, the propensity score is a feature that can be used by the automated contextual marketing model to refine decision making for selectively directing a marketing campaign to a user.

The propensity score may, for example, inform the automated contextual marketing function of the system and human marketers and data scientists. However, it should be understood that some embodiments operate automatically, absent such human interactions.

Moreover, the propensity score may be incorporated into automated monitoring of the performance of the contextual marketing systems or its components. For example, once the propensity score is determined, hypothetical scenarios are determined based on, for example, the sequence of daily activity. Features that would be impacted by each of the hypothetical scenarios are determined. New propensity scores are determined for each hypothetical scenario to determine secondary outputs of the predictive models. The new propensity score may also be available to human marketers and data scientists who might want to interact with the system. Thus, taken together, the disclosed principles are directed towards a novel contextual marketing system based on predictive modeling of users of a system and/or service.

"Churn" indicates any subscriber who has completely stopped using the service and is unlikely to return: a subscriber lost. The disclosed principles are directed towards calculating propensity scores and predicting scenarios and calculating a propensity score based on whether a subscriber is likely to churn in each hypothetical scenario. In some examples, a machine learning system is able to assess a subscriber at the point of him/her stopping use of the platform or service and assign a propensity score. In some examples, "churn" is defined as a curtailed usage of activity with the platform. In alternative examples, a machine learning system is able to assess a subscriber prior to his/her stopping use of the platform or service and assigns a propensity score. In some examples, "churn" is defined herein as a reduction in activity. The specific definition of what constitutes "reduction" may vary between service provider, reflecting the provider's own policies, since these have direct impact on subscriber behavior and decision making.

"Conversion" or non-conversion can be measured with respect to conversion optimization, or conversion rate optimization (CRO). CRO is a measurement of trial users that convert to subscribers, or more generally, take any desired action on a platform interface. In some examples, a machine learning system is able to assess a trial user at the conclusion of the trial membership and assign a propensity score. In some examples, "non-conversion" is defined as a failure to convert the trial user to a subscriber. In alternative examples, a machine learning system is able to assess a trial user prior to his/her stopping use of the platform or service, and/or before the end of the trial period, and potentially retain the trial user. The definition of conversion implemented herein may be a weaker one than some service provider's definition (in the sense that it is a more general definition that might typically be used by a provider). Instead, non-conversion is defined as a reduction in activity or an identification of a specific activity. Non-conversion is not the same as churn, although both are generalized herein as a loss risk.

It is noted that while embodiments herein are described with reference to SaaS, PaaS, or IaaS users, where the users are different from the service providers, other intermediate entities may also benefit from the principles disclosed herein. For example, the embodiments disclosed herein may be applied to banking industries, cable television industries, retailers, wholesalers, or virtually any other industry in which that industry's customers interact with the services and/or products offered by an entity within that industry.

FIG. 1 illustrates an example server provider (SP) system 100 in which certain examples of the disclosed principles may be implemented. The example SP system 100 includes a network 111, client device 101, contextual marketing (CMM) device 106, and service provider devices 107-108.

The network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, enabling messages to be sent from one LAN to another. Furthermore, remote computers and other related electronic devices could be remotely connected to either LANs or WANs via a modem and temporary telephone link. Network 111 includes any communication method by which information may travel between computing devices.

The client device 101 may include virtually any computing device that typically connects using a wired communications medium such as telephones, televisions, video recorders, cable boxes, gaming consoles, personal computers, multiprocessor systems, microprocessor-based or programmable consumer electronics, network PCs, or the like. The client device 101 may further be configured to include a client application that enables the user to log into a user account that may be managed by the service provider. Information provided either as part of user account generation, user account utilization, and or other activity may result in providing various user profile information. Such user profile information may include, but is not limited to, type of user and/or behavioral information about the user. For example, the user might be determined to be a trial user, who is less than twenty-eight days into a trial membership of a specific platform. The user profile is subsequently used to predict the likelihood of the trial user to convert to a subscriber. In some examples, the user profile information includes identification information of users who have subscribed to a specific platform but are in the first three months of their subscription. The user profile is subsequently used to predict the likelihood of the user to churn.

The CMM device 106 may include virtually any network computing device that is specially configured to determine non-conversion/churn risks for each user having exhibited a sequence of behaviors. Devices that may operate as CMM device 106 include, but are not limited to, personal computers, desktop computers, multiprocessor systems, microprocessor-based or programmable consumer electronics, network PCs, servers, network appliances, and the like.

Although CMM device 106 is illustrated as a distinct network device, the disclosed principles are not so limited. For example, a plurality of network devices may be configured to perform the operational aspects of CMM device 106. For example, data collection might be performed by one or more set of network devices, while processing the collected data to determine the propensity score may be performed by one or more other network devices.

Service provider devices 107-108 may include virtually any network computing device that is configured to provide, to CMM device 106, information including product usage characteristic information, user information, and/or other context information, including, for example, the number of bank accounts the user has added, the number of trips the user has reviewed, the ratio of business trips to personal trips, etc. In some embodiments, service provider devices 107-108 may provide various interfaces including, but not limited to, those described in more detail below in conjunction with FIG. 2.

Figure 2:
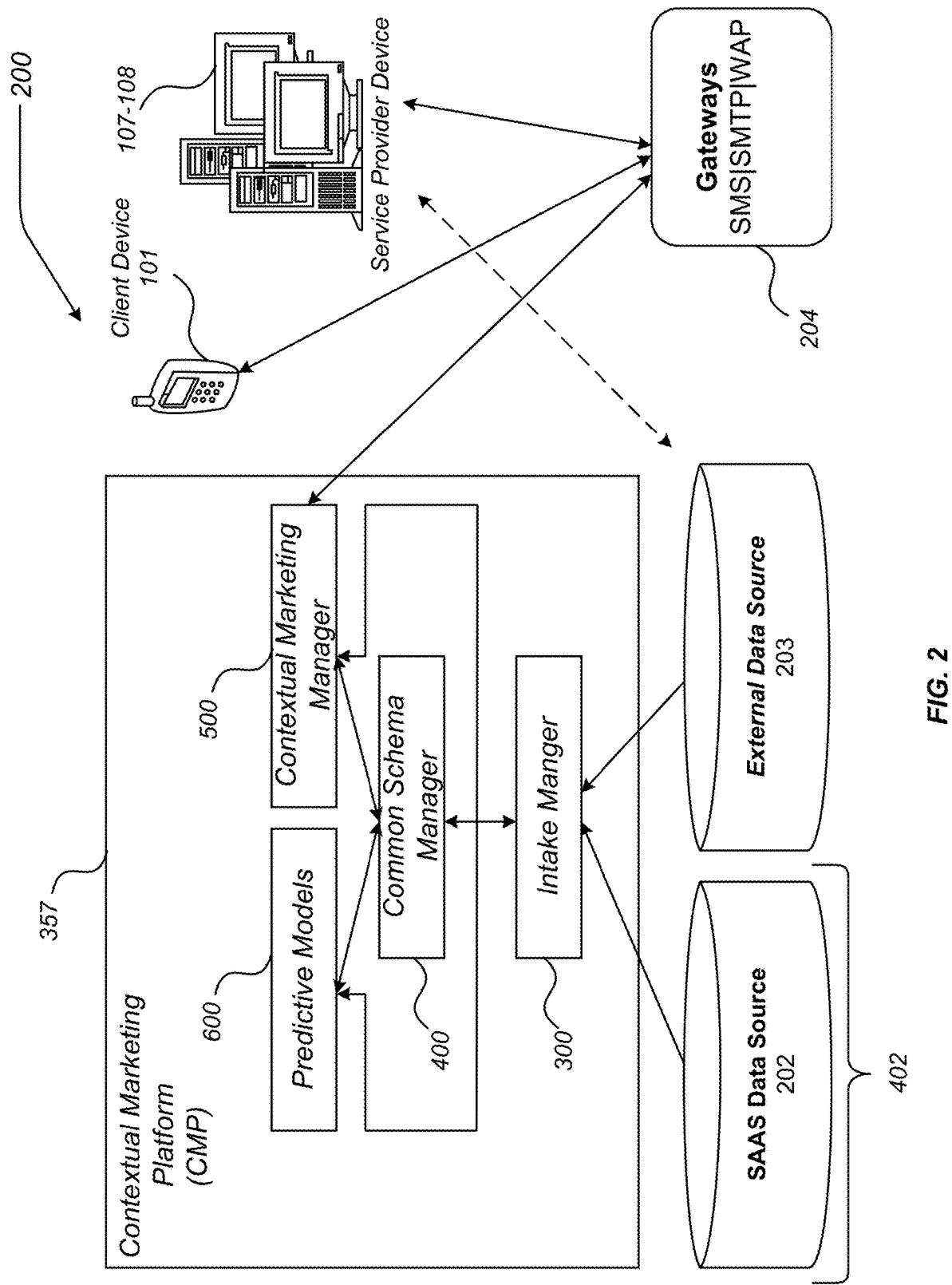
FIG. 2 shows one example of a contextual marketing architecture that may be useable to create message content that is most likely to increase conversion and/or customer retention based on predictive modeling, in which certain examples of the disclosed principles may be implemented.

FIG. 2 shows one example of a contextual marketing architecture 200 that may be used to determine a propensity score indicating the likelihood that a user will convert and/or churn in accordance with the disclosed principles. The contextual marketing architecture 200 of FIG. 2 may include many more components than those shown. The components shown, however, are sufficient to disclose an illustrative embodiment for practicing the disclosed principles. The contextual marketing architecture 200 may be deployed across the components of FIG. 1, including, for example, the CMM device 106, the client device 101, and/or the service provider devices 107-108.

The contextual marketing architecture 200 includes a contextual marketing platform (CMP) 357, a data source 202, and an external data source 203. The contextual marketing platform 357 includes Predictive Models 600 and Contextual Marketing Manager (CMM) 500. Briefly, the Predictive Models 600 are implemented to receive a propensity score, implement a simulation model that augments a user's actual actions with hypothetical scenarios they could take, receive a propensity score for each hypothetical scenario, and select at least one service provider feature in the hypothetical scenarios based in part on the propensity score. The propensity score is recalculated based on each of the hypothetical scenarios. The largest propensity score gains are determined, and the top hypothetical scenario(s) that indicates the largest gain in propensity score is retained. The CMM 500 is operable to selectively prepare a message that is configured to reach a user, based at least in part on the service provider feature related to the retained top scenario. The service provider feature is any feature related to a hypothetical scenario of the user. For example, if a hypothetical scenario with a significant gain in propensity score includes the user updating his profile to include a business account, the service provider feature might include a feature related to linking business accounts. The service provider feature may include business account auditing, or automated transactional classification. The message may include content related to business account auditing or automated transactional classification.

In the illustrated example, the contextual marketing architecture 200 further includes communication channel or gateways 204 and the client device 101. Not all the components shown in FIG. 2, however, may be required to practice the examples disclosed herein and variations in the arrangement and type of the components may be made without departing from the spirit or scope of the present disclosure.

The data source 202 may be implemented within one or more service provider devices 107-108 of FIG. 1. The data source 202 may be configured to store such historical data as a customer's profile, including its billing history, platform subscriptions, feature information, content purchases, client device characteristics, and the like. Historical data is any data that is received and processed at some other time other than real time. For example, in a daily updated batch model the historical data can include any data received the day before. In contrast, current data is any data that is received and processed in real-time upon receipt of receiving said data. The data source 202 may store various historical data as well as current data including but not limited to product and/or service use behaviors, and the like. The data source 202 may also provide information about a time when such communications occur, as well as a physical location for which a user might be connected to during a communication.

The CMP 357 may also receive data from external data source 203. External data source 203 may include virtually any mechanism usable for storing and managing data including, but not limited to, files stored on a disk or other computer readable medium, an application, such as a database or spreadsheet, a web service, or the like. External data source 203 may provide, but is not limited to providing, publicly available information about a user, including identifiers, demographic information, or the like. In addition to data generated by or relating to a specific user, external data source 203 may also provide contextual information that is broadly applicable to a wide range of users, such as, but not limited to, a schedule of events relevant to a geographic area, or the like. The CMP 357 is streamlined to quickly receive and process the incoming data through various data cycles. For example, the CMP 357 may perform the following tasks daily: generate a propensity score, implement a model that augments a user's actual actions with hypothetical scenarios they could take and select at least one service provider feature based in part on the propensity score. For example, if a user has done nothing on Day 1 but adds a bank account on Day 2, then the CMM 500 selectively prepares a message based at least in part on the new information. Also, the user might probably be considered more likely to convert based on the increased interaction, increasing a propensity score for the user, leading to a change in the messaging intensity. As user 'A' grows 'older' the next day, he/she will "graduate" from model 1 to receive a propensity score generated by model 2. At each single day, only the most up to date model will be applied to generate the propensity score.

Gateways 204 may include one or more components that are configured to enable network devices to deliver and receive interactive communications with one or more users. In one embodiment, gateways 204 may be implemented within one or more of service provider devices 107-108, client device 101 and/or within networks 111 of FIG. 1.

CMP 357 is configured to receive user data from the data source 202 and the external data source 203. CMP 357 may then implement intake manager 300 to parse and/or store the incoming data. One example of an intake manager 300 is described in more detail below in conjunction with FIG. 3. The data may then be provided to common schema manager 400, which may compute various additional attributes, manage updates to state vectors for entities (users) within the system, further map raw data into a common schema, and determine a propensity score for the user based on the same. The common schema data may then be used to support a number of hypothetical models, including Predictive Models 600. Predictive Models 600 are configured to generate indices that are provided to common schema manager 400 to become part of the common schema data. In some instances, it may also be possible to provide the raw data directly to the models, for example, to the Predictive Models 600, and the Predictive Models 600 determine the propensity scores. This may be desirable when provider specific data that is not captured by the common schema nevertheless proves to be of high value for the Predictive Models 600 or is otherwise useful in the operation of the CMP 357.

It should be noted that the components shown in CMP 357 of FIG. 2 are configured to execute as multiple asynchronous and independent processes, coordinated through an interchange of data at various points within the process. As such, it should be understood that managers 300, 400 and 500 may operate within separate network devices, such as multiple network devices, within the same network device within separate CPUs, within a cluster computing architecture, a master/slave architecture, or the like. In at least one embodiment, the selected computing architecture may be specially configured to optimize a performance of the manager executing within it. Moreover, it should be noted that while managers 300, 400 and 500 are described as processes, one or more of the sub-processes within any of the managers 300, 400 and 500 may be fully implemented within hardware, or executed within an application-specific integrated circuit (ASIC), that is, an integrated circuit that is customized for a particular task.

Figure 3:
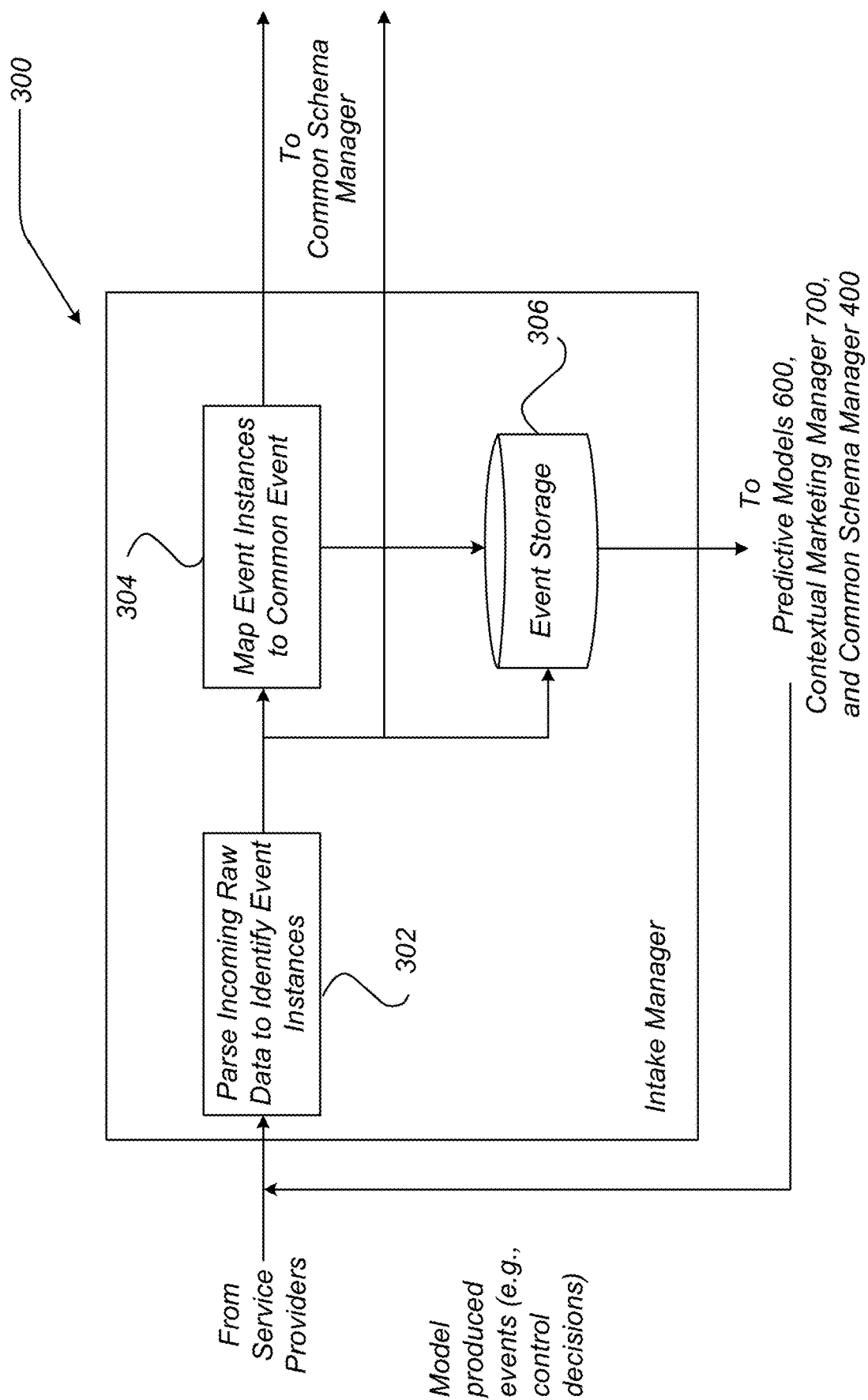
FIG. 3 shows one embodiment of an intake manager (IM), configured to provide a framework for accessing raw or model produced data files, in which certain examples of the disclosed principles may be implemented.

FIG. 3 shows one embodiment of an intake manager (IM) 300 configured to provide a framework for accessing raw or model produced data files that may include transactional and/or behavioral data for users of a service provider.

IM 300 may receive data as described above; for example, data can be received daily to produce an up-to-date model and to generate the prediction score. IM 300 may implement a sub-process 302 to parse incoming data to identify event instances, locate new files, and perform any copying of the files into various storage locations and registries, such as event storage 306. Parsing may include, among other actions, matching one or more events from a given file to one or more entities, extracting event types, event instances, or the like. Any data translations or registrations may also be performed upon the incoming data at sub-process 302.

The data may then be provided to sub-process 304, where various event instances may be identified and mapped to common events. For example, in one embodiment, a service provider may identify events that occurred on Day 1 or from other types of data using a specified share of the user (timeframe, status, etc.). Sub-process 304 may examine the incoming event instances, and so forth, to generate common events with common terminology, form, formats, and so forth, to be provider agnostic. As indicated above, once the propensity score is determined, hypothetical scenarios are determined based on, for example the common events. This is described below in further detail with respect to FIGS. 4-6.

Figure 4:
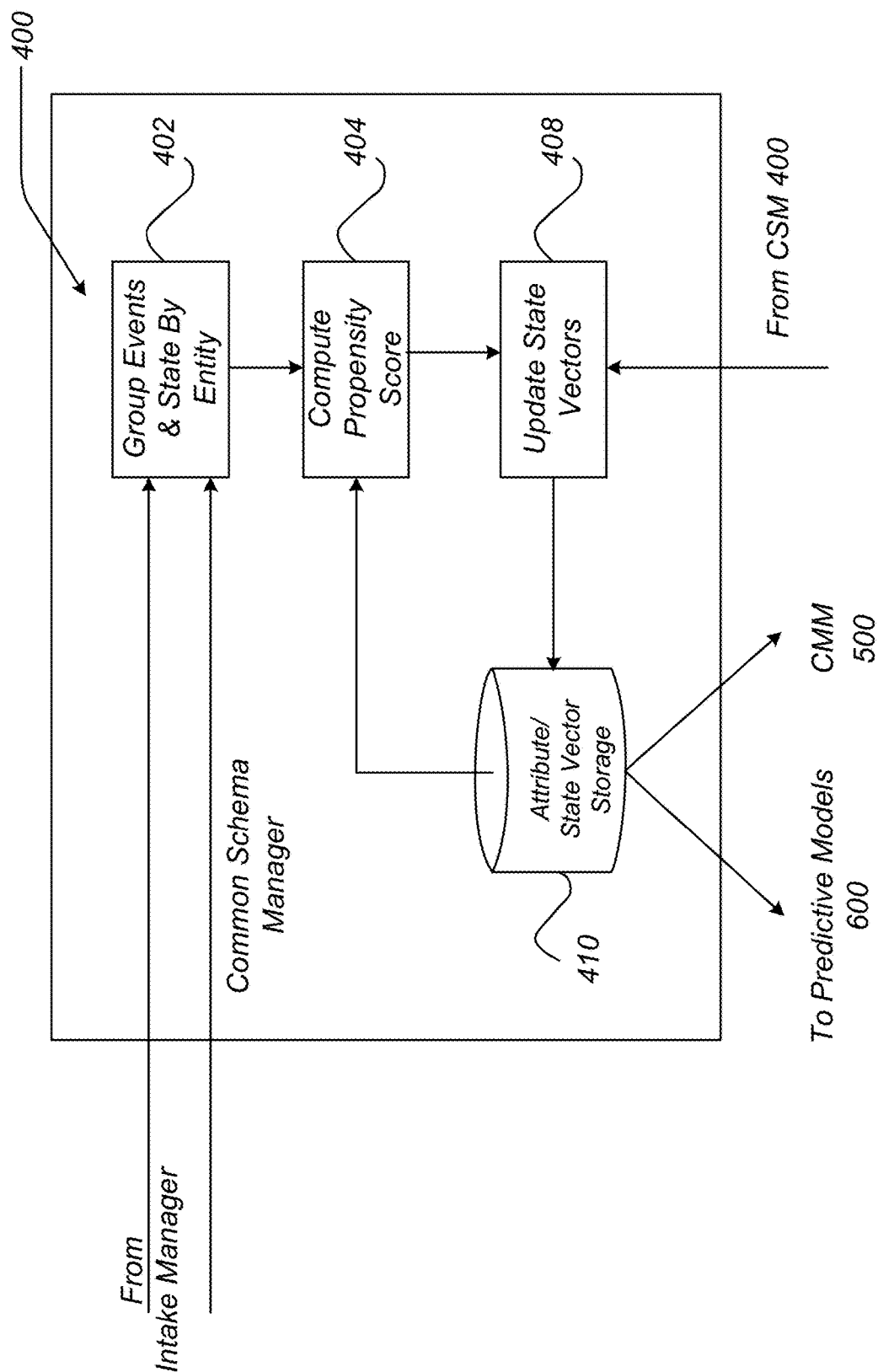
FIG. 4 shows one example embodiment of a Common Schema Manager (CSM) usable within the Contextual Marketing Platform (CMP) of FIG. 2, in which certain examples of the disclosed principles may be implemented.

FIG. 4 shows an example of a Common Schema Manager (CSM) 400 that may be used within the CMP 357 of FIG. 2. It should be noted that CSM 400 may include more or less components than those shown in the figure. However, those components shown are sufficient to practice the disclosed innovations.

The user may be defined as an entity, where a propensity score of the entity is determined. The propensity score may be based on various attributes of the user. For example, the status of the user, the age of the user's membership/trial, the subscribed platform, etc., may be used as training data to train machine learning models that may be used to determine the propensity score. It is noted that while many attributes of an entity may be directly obtained from the raw data, or as a result of actions performed within IM 300, there are some attributes that may also be computed or otherwise derived. CSM 400 therefore is further configured to compute attributes for entities. The machine learning models may be updated based on daily updated state data, or the like, to compute a new propensity score.

As shown in FIG. 4, CSM 400 receives data from IM 300 at sub-process 402, where the received data may be grouped by entity. Thus, events, state data, and so forth may be organized by entity in one example. The sub-process 402 may extract some data points from the received data as described above and use a classifier (e.g., a machine learning classifier such as random forest, linear regression, support vector machine, logistic regression, XGboost, etc.) to preliminarily classify the extracted data points by entity (classifications include, for e.g., likely to churn, likely not to churn, likely to convert, likely not to convert, etc.). The extracted datapoints are referred to herein as attributes.

The results may flow to sub-process 404 where the propensity score may be computed and provided to sub-process 408 to store and/or update state vectors for entities in attribute/state vector storage 410. The sub-process 404 may apply a trained model to recognize patterns associated with risk loss based on the attributes. In some examples of the disclosure, these trained models may be engineered by human users who define such attributes and/or data classifications. However, other embodiments may use deep neural networks to learn information from the received data. Sub-process 404 may compute a propensity score using machine learning/neural networks which have been trained to determine to such propensity scores based on a variety of attributes. The attributes include, but are not limited to, recursive independent attributes, attributes having complex forms, attributes that may be computed from data provided by Predictive Models 600.

Deep neural networks may include a recurrent neural network (RNN), which is a type of network that may process tasks with arbitrary sequences of inputs. RNN has a high-dimensional hidden state with non-linear dynamics that encourage RNNs to take advantage of previous information. RNNs may be used for classifications with short-term dependencies that do not depend on the context of the text, because RNNs may be affected by vanishing gradient issues. Long short-term memory (LSTM) is a variant of RNN which may be equipped to deal with the gradient vanishing and exploding problems when learning with long-range sequences. LSTM networks are the same as RNN, except that hidden layer updates are replaced by memory cells. Basically, a memory cell unit may include three multiplicative gates that control the proportions of information to forget and to pass on to the next time step. The original LSTM uses only previous contexts for prediction.

The computed propensity score may be used to update state vectors for an entity or the like, which may be performed by sub-process 404. The updated state vectors may be extracted by sub-process 404 from the data stores and provided to sub-process 408. While shown within CSM 400, attribute/state vector storage 410 may reside in another location external to CSM 400. However, attribute/state vector storage 410 is illustrated here merely to show that data may be used and/or provided by different sub-processes of CSM 400. Attribute/state vector storage 410 may also store and thereby provide attribute dependency data, indicating, for example, whether an attribute is dependent upon another attribute, whether a current dependency state is passed to attributes at a computation time, whether dependencies dictate a computation order, or the like. Output of CSM 400 may flow, among other places to the Predictive Models 600 and the Contextual Marketing Manager 500 of FIG. 2, and conversely, those components may provide updated attribute information to sub-process 408 in order that it may be added to attribute/state vector storage 410 and recompute the propensity score.

As noted, the Predictive Models 600 and the Contextual Marketing Manager 500 may, although not exclusively, receive data after it has been mapped to the common schema. The data available in the event storage 306 or attribute/state vector storage 410 contains a wide range of information about individual users (e.g., a date an account was established), usage events associated with that user (e.g., number of bank accounts added, third party add-on subscriptions), and the propensity score for the user based on the current state information.

Figure 5:
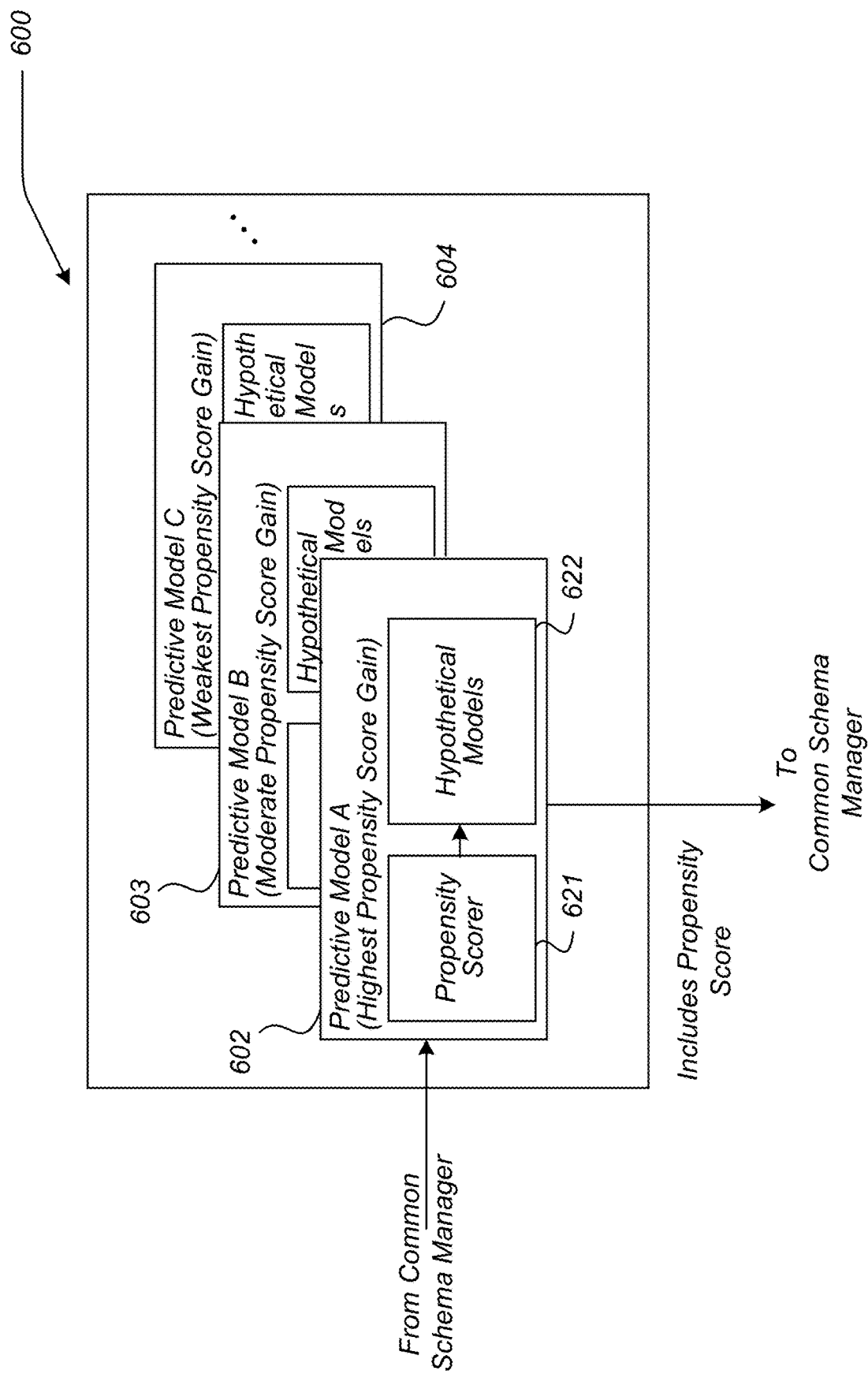
FIG. 5 shows one example embodiment of a Contextual Marketing Manager (CMM) usable within the CMP of FIG. 2, in which certain examples of the disclosed principles may be implemented.

FIG. 5 shows one embodiment of Predictive Models 600 that may be used with the CMP 357 of FIG. 2. As shown, Predictive Models 600 may include a plurality of predictive models 602-604. Each predictive model 602-604 may include a plurality of sub-components. Predictive models 602-604 may include more or less components than those shown in FIG. 5. However, the components shown are sufficient to disclose an illustrative embodiment for practicing the subject disclosure.

A propensity score is determined for each of the predictive models 602-604 of the Predictive Models 600. Each of the predictive models 602-604 is a computer-generated simulation model that augments a user's current state to determine a hypothetical scenario based on the data available in the event storage 306 or attribute/state vector storage 410.

Each of the predictive models 602-604 is a dynamic state-space model realized within a machine learning (ML) framework. The ML framework is a model for producing sequences with certain statistical properties. In some examples, the ML framework applies certain assumptions to the more general set of state-space models. In particular, an assumption made within the ML framework is that sequences of observations represent events which are generated by a user in a given state. Using the observed sequences from many subscribers one can deduce the most likely set of model parameters to have generated the observations (i.e., train the model). Once a model is identified, one may compute the likelihood that it would generate a particular observed sequence. The ML framework can derive a model operable to recognize churners and non-churners. As a result, it is possible to decide whether a subscriber's recent activity is more representative of a churner or a non-churner.

The ML framework may construct sequences of behavioral observations for the user and determining a loss label for model training and (once enough time passes for it to become available) monitor the operational model performance. For model training and calibration, data available in the event storage 306 or attribute/state vector storage 410 is split into independent sets for training, testing, and validation. Furthermore, the training and test sets may actually be a single train/test set for use with a cross-validation approach to model determination. Cross-validation is a process in which separate train and test sets are repeatedly chosen at random from a joint train/test set and many candidate models trained to provide information on (and furthermore reduce) the bias induced by a particular choice of training and test sets.

Periodic (e.g., daily) time series of user behavior are constructed from common schema attributes. Several considerations are made while constructing the sequences. One such consideration includes selecting the features of interest.

To determine which features to use, many potential models are constructed and tested. The best performing models, and the features associated with them, are selected. The determination of "best" does not imply simply selecting the features which appear in the single highest performing candidate, but in selecting features common to several of the highest performing models. That is, features are selected for both absolute performance and robustness.

The hypothetical scenario may include at least one hypothetical attribute of the user, at least one hypothetical state vector data of the user, and at least one related service provider feature. The hypothetical attribute may include an attribute of the user in the hypothetical scenario of the simulation model. The hypothetical attribute and state vector data is received at the sub-process 408 so that it may be added to attribute/state vector storage 410 of CSM 400 and recompute the propensity score. The Predictive Models 600 are operable to receive a propensity score 621 for each hypothetical model 622. In other words, the propensity score is recalculated based on each of the hypothetical scenarios. A predetermined threshold may be established for an increase in the propensity score from the initial propensity score. The propensity score whose gains reach and/or exceed the predetermined threshold is identified. The top hypothetical scenario(s) that indicates the largest gain in propensity score is retained.

Each predictive model 602-604 may include a propensity score 621 and a hypothetical model 622. The hypothetical model 622 includes a hypothetical scenario that is most likely to increase conversion potential while the propensity score 621 includes the propensity score for the identified hypothetical scenario. A hypothetical model may be applied to active users. In some examples, it is unnecessary to apply the model to users who do not have any recent account activity. Furthermore, if inactive users were retained during model training, the expected quality of the model would decrease. In any event, adding a significant number of low-information data to the training set would unnecessarily increase the computational expense (measured in either time or computational resources) necessary to train the model. Thus, the hypothetical model 622 is and the propensity score 621 are determined daily.

Predictive Models 600 augment the user's actual actions with hypothetical actions that the user could theoretically take, as performed by hypothetical models 622. This is a key distinction between the disclosed approach and traditional models, which are generally limited to the individual features, using data already in existence, and that do not simulate the actual scenario. The distinguishing factor is that a hypothetical model explicitly represents a hypothetical scenario from the user's present state. For example, the Predictive Models 600 could generate a hypothetical scenario where the user reviews five (more) transactions, a hypothetical scenario where the user took one (more) vacation, and a hypothetical scenario where the user added another bank account to his/her platform profile. Each of these scenarios are illustrated as predictive models 602-604.

The hypothetical model 622 may include at least one hypothetical attribute of the user, at least one hypothetical state vector data of the user, and at least one service provider feature. The at least one service provider feature may be determined to be a platform feature that would be impacted by the respective predictive models 602-604.

Figure 6:
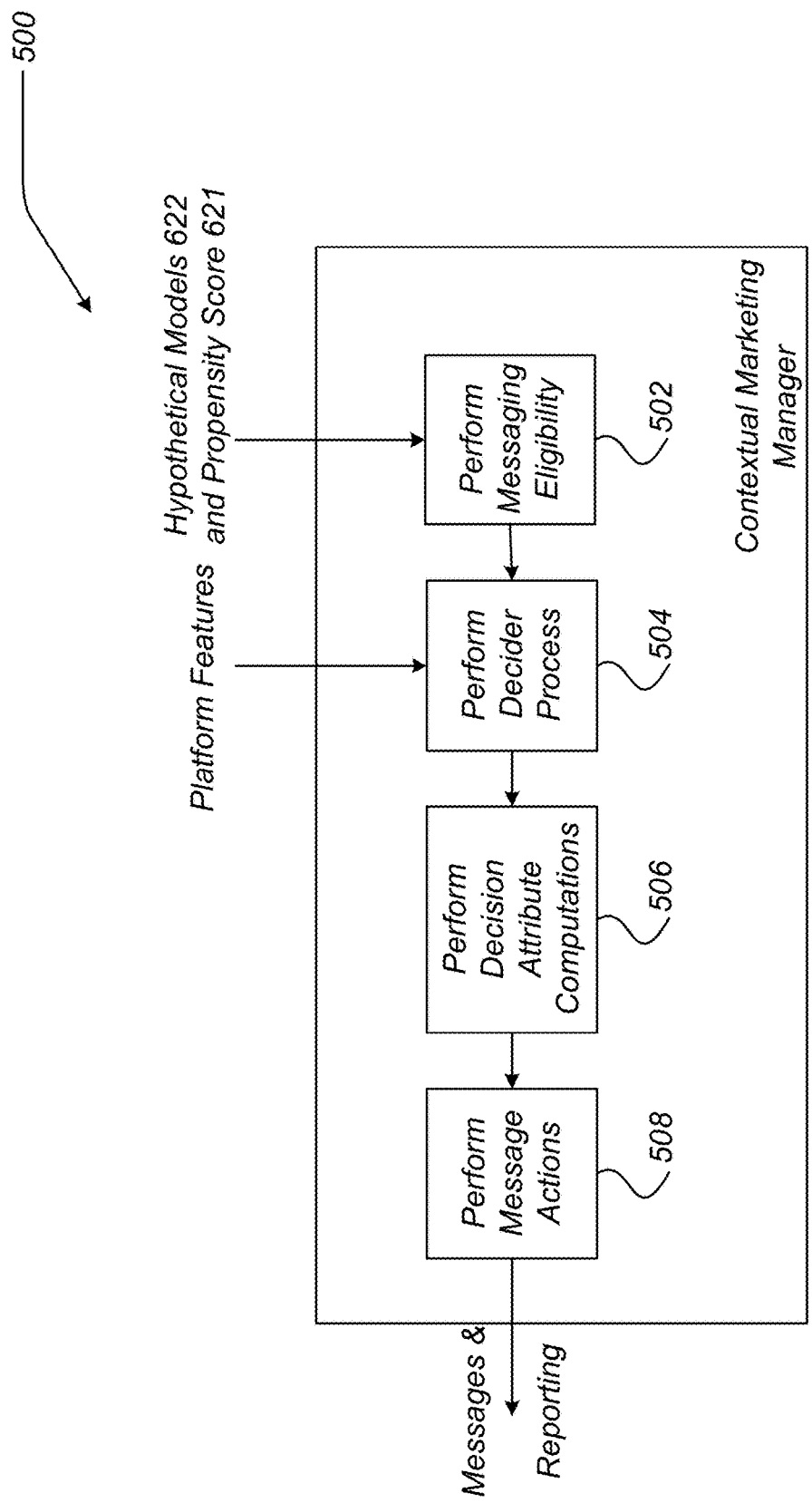
FIG. 6 shows one example of Predictive Models operable with the CMP of FIG. 2, in which certain examples of the disclosed principles may be implemented.

FIG. 6 shows one embodiment of the contextual marketing manager (CMM) 500 operable within the CMP 357 of FIG. 2. As shown, the CMM 500 is operable to perform adaptive analysis to identify messaging eligibility for a user (at subprocess 502).

In one embodiment, sub-process 502 receives the propensity score 621 and the hypothetical model 622 for the user from the Predictive Models 600. As indicated above, the hypothetical model 622 will include at least one hypothetical attribute of the user, at least one hypothetical state vector data of the user, and at least one service provider feature. In one configuration, the result of sub-process 502 is a ranked ordered list of possible messaging that a user may be eligible to receive based on the hypothetical model 622. In one embodiment, sub-process 502 includes ranking messaging content, based on, for example, a predictive impact of each hypothetical scenario (i.e., the propensity score of each hypothetical scenario), with the objective of generating secondary outputs of the predictive models 602-604.

Decider sub-process 504 uses the rank ordered messaging for each user in conjunction with platform features to deliver the messaging to the user to reduce loss risk. For example, an initial propensity score can be used to assign a user to four bins, where one is the least likely to convert and four is the most likely to convert. These bins determine the intensity and duration of the messaging. The top two scenarios are used to determine the message content and order. The output of the decider process includes a validated assignment of each user to a bin, or a control group, which is used by sub-process 506 to update various decision attributes, and by sub-process 508 to compose and send various messages to a user. Thus, the propensity score can be used to rank the predicted effectiveness of various messages and to define eligibility requirements that may be used by CMM 500 to direct marketing campaigns or that match appropriate offers, incentives, and messages to a select user.

In another example, CMM 500 uses the propensity score to indicate the likelihood that a user will convert and/or churn in accordance. For example, sub-processes 502 and 504 are directed towards making marketing decisions about what messaging content should be provided and when should that messaging content be received to increase the propensity score for the user.

It is noted that CMM 500 may include many more or less components than shown in FIG. 5; however, those shown are sufficient to disclose illustrative embodiments for practicing the subject innovations.

The CMM 500 and the Predictive Models 600 can be used to prepare messaging content. For example, a trial user who is undecided regarding subscribing to a service provider's platform can be categorized as a moderate-propensity user. The user may receive an email with a coupon to be applied towards their subscription, and a recommendation for ways to use the product to his/her full advantage based on the predicted output (propensity scores, and next suggested actions from the hypothetical model 622) of the Predictive Models 600.

The propensity score can also be used to segment users and determine the frequency of a marketing campaign based the segmented users or decide whether or not to send the marketing campaign to a specific segment. For example, it may be decided to send a specific marketing campaign to high risk churners, and not to low risk churners. Moreover, the propensity score can be generated and updated as the user's engagement with the service provider's platform ages. The marketing campaigns sent to the user over the life of the user's engagement with the service provider's platform ages is noted and stored. The updated propensity score is used as indicia of experimental success for marketing experiments. For example, a marketing campaign can set up an email experiment for all trial users on Day 1 of their trial via a simple randomized A/B test. If successful, the email sent to the test group should increase the conversion propensity scores in future days, giving access to a simple early indicator of success before waiting for final outcomes to process, weeks after the campaign was sent.

The propensity score can also be used to augment a call agent's understanding of a target user. Based on the CSM 400 and the Predictive Models 600, the user profile can be fully developed. For example, a call center can be integrated into the Predictive Models 600, granting a call agent access to a user's relevant predicted information. The call agent is able to efficiently assist the user all while focusing on improving the likelihood that a user will convert and/or churn in accordance with the disclosed principles.

Figure 7:
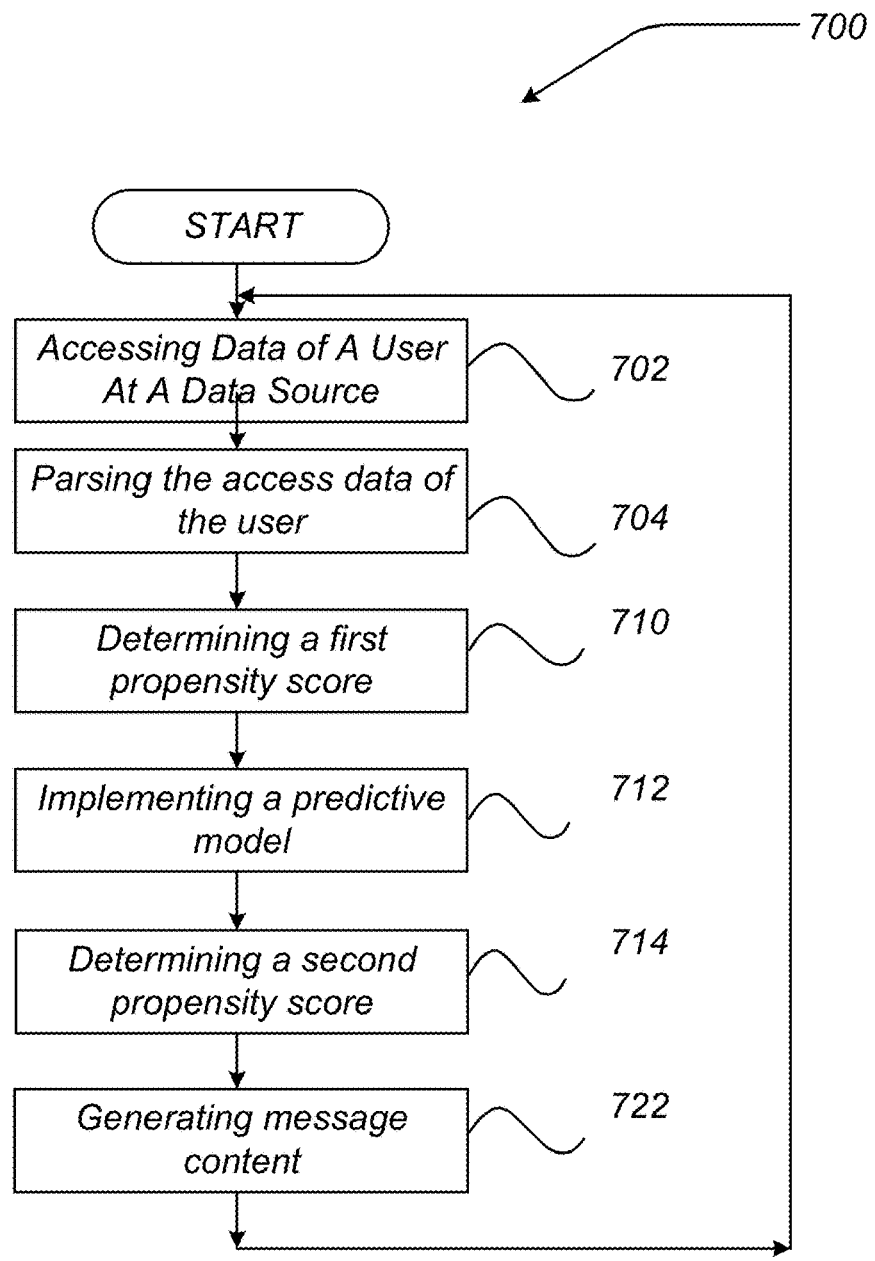
FIG. 7 shows one example of a process flow operable to provide predictions for marketing use, in which certain examples of the disclosed principles may be implemented.

The operation of certain aspects of the CMP 357, and its components of FIG. 2-6 are now described with respect to the process 700 illustrated in FIG. 7, which may be used to simulate hypothetical scenarios and determine propensity scores. Process 700 may be implemented within the CMP 357 of FIG. 2, as discussed herein.

Process 700 may begin at block 702, where data of the user may be accessed at a data source. In some examples, the data source includes historical data and current state data associated with the user.

Processing moves to block 704, where the accessed data of the user may be parsed to identify event instances, as discussed above in conjunction with FIGS. 3-4.

At block 710, process 700 may determine a first propensity score based on the historical data and the current state data associated with the user.

Processing proceeds to block 712, where a predictive model is implemented to augment the event instances. The predictive model is implemented to determine at least one hypothetical scenario. In some examples, the hypothetical scenario includes an associated service provider feature, a hypothetical attribute of the user and/or a hypothetical state data of the user.

After implementing a predictive model at block 712, process 700 proceeds to block 714 where a second propensity score is determined based on the hypothetical attribute of the user and/or the hypothetical state data of the user. It is determined whether the second propensity score reaches or exceeds a predetermined threshold. The first propensity score and the second propensity score may be determined daily.

Process 700 proceeds to block 722 where message content is generated to deliver to the user based on the determined second propensity score and the service provider feature.

It will be understood that each block of the processes, and combinations of blocks in the processes discussed above, can be implemented by computer program instructions. These program instructions may be provided to a processor to produce a machine, such that the instructions, which execute on the processor, create means for implementing the actions specified in the block or blocks. The computer program instructions may be executed by a processor to cause a series of operational steps to be performed by the processor to produce a computer-implemented process such that the instructions, which execute on the processor to provide steps for implementing the actions specified in the block or blocks. The computer program instructions may also cause at least some of the operational steps shown in the blocks to be performed in parallel. Moreover, some of the steps may also be performed across more than one processor, such as might arise in a multiprocessor computer system. In addition, one or more blocks or combinations of blocks in the illustration may also be performed concurrently with other blocks or combinations of blocks, or even in a different sequence than illustrated without departing from the scope or spirit of the subject innovation. Accordingly, blocks of the illustration support combinations of means for performing the specified actions, combinations of steps for performing the specified actions and program instruction means for performing the specified actions. It will also be understood that each block of the illustration, and combinations of blocks in the illustration, can be implemented by special purpose hardware-based systems, which perform the specified actions or steps, or combinations of special purpose hardware and computer instructions.

What is claimed is:

1. A computer implemented method for determining churn risk associated with a user of a trial version of a software service and generating messaging content to minimize the risk, said method being performed on a computing device and executed by a processor, said method comprising:
   accessing data of the user at a data source, the data of the user comprising historical data and current state data associated with the user;
   parsing the accessed data of the user to identify event instances;
   determining an initial propensity score based on the historical data and the current state data associated with the user;
   in response to determining that the initial propensity score indicates a high churn risk associated with the user:
      identifying a first hypothetical scenario associated with a first trained hypothetical model of a first machine learning model and a second hypothetical scenario associated with a second trained hypothetical model of a second machine learning model, wherein each of the first and the second hypothetical scenarios include a corresponding associated software service provider feature, among a plurality of software service provider features, a corresponding hypothetical attribute of the user, and a corresponding hypothetical state data of the user, wherein the first machine learning model and the second machine learning model were trained by segmenting a collection of historical data and current state data, stored at the data source as events and state vectors, into a training set, a test set, and a validation set and passing the training set, the test set, and the validation set through the first machine learning model and the second machine learning model;
      implementing the first hypothetical model of the first machine learning model to determine a first propensity score associated with the first hypothetical scenario based on the corresponding hypothetical attribute and the corresponding hypothetical state data, wherein the first propensity score represents a higher propensity score gain;
      implementing the second hypothetical model of the second machine learning model to determine a second propensity score associated with the second hypothetical scenario based on the corresponding hypothetical attribute and the corresponding hypothetical state data, wherein the second propensity score represents a lower propensity score gain;
   determining whether the first or the second propensity score meets a predetermined threshold;
   generating message content to deliver to the user based on the determined propensity score that exceeds the predetermined threshold and at least one service provider feature; and
   updating the state vectors based on the first propensity score and the second propensity score, wherein the first machine learning model and the second machine learning model are retrained based on the updated state vectors.

2. The computer implemented method of claim 1, wherein the first propensity score and the second propensity score are determined daily.

3. The computer implemented method of claim 1, further comprising ranking messaging content based on the propensity score that exceeds the predetermined threshold to generate secondary outputs of at least one of the first machine learning model and the second machine learning model.

4. The computer implemented method of claim 3, further comprising generating the message content to deliver to the user based in part on the ranked messaging content.

5. The computer implemented method of claim 1, further comprising updating the current state data associated with the user based on the generated message content.

6. The computer implemented method of claim 5, further comprising using the propensity score that exceeds the predetermined threshold to determine an effectiveness of the generated message content.

7. The computer implemented method of claim 1, wherein the churn risk is either an indicator of whether the user will convert a trial membership to a subscriber membership or an indicator of whether the user will stop using the trial membership.

8. A system comprising:
   a non-transitory data storage device; and
   one or more special purpose computing devices that access and store data on the data storage device and employ at least one processor to perform actions, including:
   accessing data of a user at a data source, the data of the user comprising historical data and current state data associated with the user;
   parsing the accessed data of the user to identify event instances;
   determining an initial propensity score based on the historical data and the current state data associated with the user;
   in response to determining that the initial propensity score indicates a high churn risk associated with the user:
      identifying a first hypothetical scenario associated with a first trained hypothetical model of a first machine learning model and a second hypothetical scenario associated with a second trained hypothetical model of a second machine learning model, wherein each of the first and the second hypothetical scenarios include a corresponding associated software service provider feature, among a plurality of software service provider features, a corresponding hypothetical attribute of the user, and a corresponding hypothetical state data of the user, wherein the first machine learning model and the second machine learning model were trained by segmenting a collection of historical data and current state data, stored at the data source as events and state vectors, into a training set, a test set, and a validation set and passing the training set, the test set, and the validation set through the first machine learning model and the second machine learning model;

implementing the first hypothetical model of the first machine learning model to determine a first propensity score associated with the first hypothetical scenario based on the corresponding hypothetical attribute and the corresponding hypothetical state data, wherein the first propensity score represents a higher propensity score gain implementing the second hypothetical model of the second machine learning model to determine a second propensity score associated with the second hypothetical scenario based on the corresponding hypothetical attribute and the corresponding hypothetical state data, wherein the second propensity score represents a lower propensity score gain;

determining whether the first or the second propensity score meets a predetermined threshold;

generating message content to deliver to the user based on the determined propensity score that exceeds the predetermined threshold and on the at least one service provider feature; and updating the state vectors based on the first propensity score and the second propensity score, wherein the first machine learning model and the second machine learning model are retrained based on the updated state vectors.

9. The system of claim 8, wherein the first propensity score and the second propensity score are determined daily.

10. The system of claim 8, further comprising ranking messaging content based on the propensity score that exceeds the predetermined threshold to generate secondary outputs of at least one of the first machine learning model and the second machine learning model.

11. The system of claim 10, further comprising generating the message content to deliver to the user based in part on the ranked messaging content.

12. The system of claim 8, further comprising updating the current state data associated with the user based on the generated message content.

13. The system of claim 12, further comprising using the propensity score that exceeds the predetermined threshold to determine an effectiveness of the generated message content.

14. The system of claim 8, wherein the initial propensity score is either an indicator of whether the user will convert a trial membership to a subscriber membership or an indicator of whether the user will churn.

15. A computing system comprising:
one or more processors; and
one or more non-transitory computer-readable storage devices storing computer-executable instructions, the instructions operable to cause the one or more processors to perform operations comprising:
accessing data of a user at a data source, the data source of the user comprising historical data and current state data associated with the user;
parsing the accessed data of the user to identify event instances;
determining an initial propensity score based on the historical data and the current state data associated with the user;
in response to determining that the initial propensity score indicates a high churn risk associated with the user:
identifying a first hypothetical scenario associated with a first trained hypothetical model of a first machine learning model and a second hypothetical scenario associated with a second trained hypothetical model of a second machine learning model, wherein each of the first and the second hypothetical scenarios include a corresponding associated software service provider feature, among a plurality of software service provider features, a corresponding hypothetical attribute of the user, and a corresponding hypothetical state data of the user, wherein the first machine learning model and the second machine learning model were trained by segmenting a collection of historical data and current state data, stored at the data source as events and state vectors, into a training set, a test set, and a validation set and passing the training set, the test set, and the validation set through the first machine learning model and the second machine learning model;

implementing the first hypothetical model of the first machine learning model to determine a first propensity score associated with the first hypothetical scenario based on the corresponding hypothetical attribute and the corresponding hypothetical state data, wherein the first propensity score represents a higher propensity score gain;

implementing the second hypothetical model of the second machine learning model to determine a second propensity score associated with the second hypothetical scenario based on the corresponding hypothetical attribute and the corresponding hypothetical state data, wherein the second propensity score represents a lower propensity score gain;

determining whether the first or the second propensity score meets a predetermined threshold;

generating message content to deliver to the user based on the determined propensity score that exceeds the predetermined threshold and on the at least one service provider feature; and updating the state vectors based on the first propensity score and the second propensity score, wherein the first machine learning model and the second machine learning model are retrained based on the updated state vectors.

16. The computing system of claim 15, wherein the first propensity score and the second propensity score are determined daily.

17. The computing system of claim 15, further comprising ranking messaging content based on the propensity score that exceeds the predetermined threshold to generate secondary outputs of at least one of the first machine learning model and the second machine learning model.

18. The computing system of claim 17, further comprising generating the message content to deliver to the user based in part on the ranked messaging content.

19. The computing system of claim 15, further comprising updating the current state data associated with the user based on the generated message content.

20. The computing system of claim 19, further comprising using the propensity score that exceeds the predetermined threshold to determine an effectiveness of the generated message content.

* * * * *